J. O. CASADAY.
PLOW COLTER.
APPLICATION FILED NOV. 16, 1916.
1,260,752.
Patented Mar. 26, 1918.
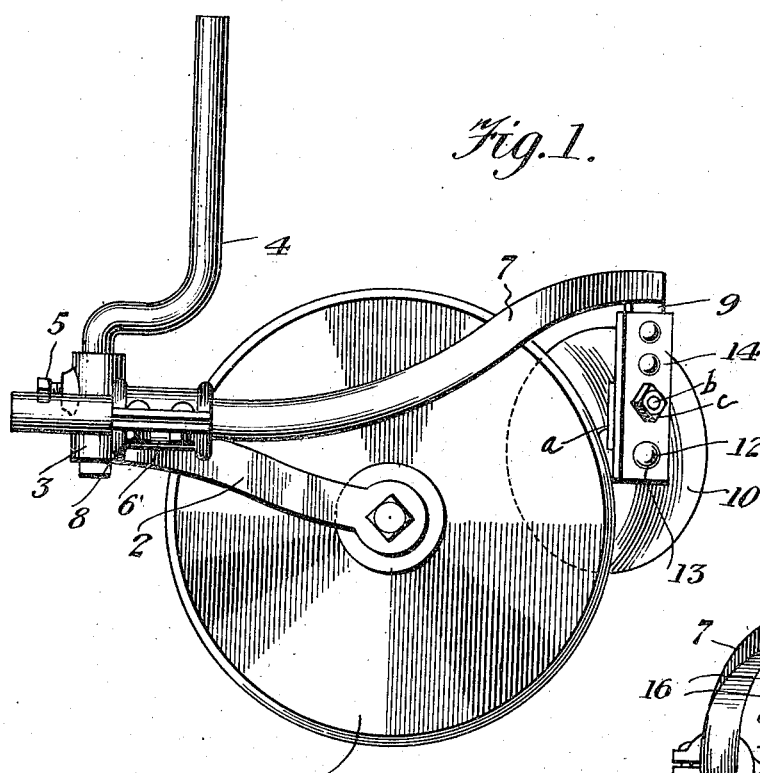
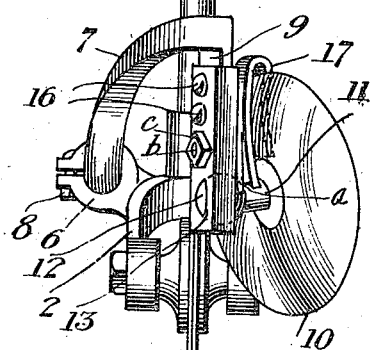
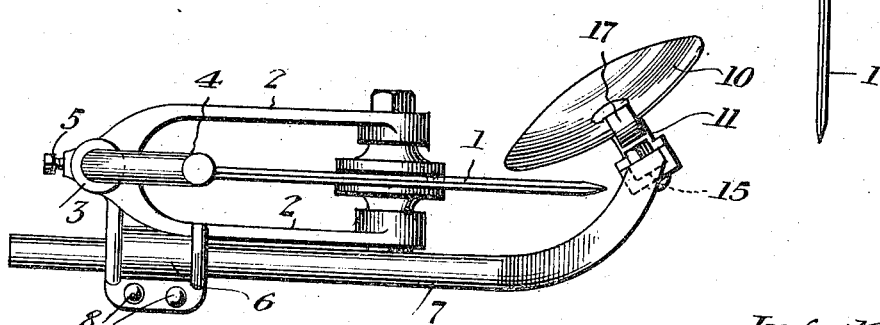
Inventor
James Oliver Casaday
By George J. Ottach
Attorney.

UNITED STATES PATENT OFFICE.

JAMES OLIVER CASADAY, OF SOUTH BEND, INDIANA.

PLOW-COLTER.

1,260,752.  Specification of Letters Patent.  Patented Mar. 26, 1918.

Application filed November 16, 1916. Serial No. 131,773.

*To all whom it may concern:*

Be it known that I, JAMES OLIVER CASADAY, a citizen of the United States, residing at South Bend, in the county of St. Joseph and State of Indiana, have invented certain new and useful Improvements in Plow-Colters, of which the following is a specification.

The invention relates to an improvement in plow colters, wherein provision is made for effectively cleaning the colter while in use.

In use, plow colters require frequent scraping or cleaning to rid them of the accumulation of material, and objection exists to those scrapers provided as attachments for the colter, in that such scrapers rapidly become ineffective owing to the transfer of the accumulated material from the colter to the scraper.

One of the objects of the present invention therefore, is to provide for use with the colter a revolving scraper which will be effective in ridding the colter from accumulation of material, and to combine with the revolving scraper, a fixed scraper which will in turn clean the revolving scraper. By this arrangement the revolving scraper is maintained at all times in condition to do effective work in scraping and cleaning the colter.

A further object is the provision of a support for the revolving scraper which may be readily connected to or disconnected from the colter yoke, and which may be adjusted with relation thereto to provide for the most effective positioning and use of the revolving scraper. The fixed scraper is mounted to be maintained in set relation to the support for the revolving scraper, the material accumulating thereon discharging therefrom by gravity, to maintain such fixed scraper in effective condition at all times.

The invention in the preferred form of details will be described in the following specification, reference being had particularly to the accompanying drawings, in which:—

Figure 1 is a side elevation illustrating the colter and the scrapers in applied positions;

Fig. 2 is a top plan view of the same;

Fig. 3 is an end elevation illustrating the connection of the revolving scraper to the scraper arm, and the application of the fixed scraper to the revolving scraper.

The drawings represent an ordinary plow colter 1, of any desired disk type, revolubly mounted in the free terminals of the arms 2 of a colter yoke, which yoke remote from the colter mounting is formed with an elongated sleeve-like bearing 3, to receive the lower end of the usual standard 4. A set screw 5 maintains a fixed relation between the colter yoke and standard, permitting desired adjustment in an obvious manner.

To one arm 2 of the colter yoke is secured, by integral formation or otherwise, a split bearing sleeve 6, formed to receive one end of a scraper arm 7. The split sections of the sleeve 6 are clamped upon the arm, to secure the latter in adjusted relation longitudinally of the sleeve, by any desired type of securing means, bolts and nuts 8 being illustrated for this purpose. The relatively rearward end of the arm 7 is curved, so that its rearward terminal extends in beyond and across the colter 1, said arm 7 being formed at such rearward end with a downturned section 9.

The revolving scraper, shown in the form of a disk 10, is revolubly mounted upon a shaft 11, the end of which remote from the scraper is formed as a ball 12, to frictionally engage a similarly shaped socket 13, in a connecting bracket 14, the lower end of a plate $a$, having a threaded bolt $b$ extending through the bracket, is drawn by means of a screw nut $c$ into engagement with the ball to clamp same against movement, this mounting permitting universal adjustment of the scraper with respect to the bracket. The bracket 14 is formed in the upper portion and on the relatively inner side with a longitudinally extending channel 15, to more or less accurately receive the downturned or depending section 9 of the scraper arm, bolts or other fastenings 16 securing the arm and bracket together.

Secured to and rising from the shaft 11 of the revolving scraper, is a fixed scraper 17, which extends upwardly and over the revolving scraper, depending on the operative side thereof and being appropriately deflected or bent so as to engage the surface of the revolving scraper, to scrape the accumulated material therefrom. It is to be noted that the fixed scraper overlies the peripheral edge of the revolving scraper, and hence is effective in removing accumulations from such edge as well as from the face of the revolving scraper. Furthermore the fixed scraper, throughout that portion cooperating with the face of the revolving scraper, extends for a distance somewhat shorter than the radial length of the revolving scraper, and furthermore is approximately vertical. This tends to an effective removal of accumulations on the revolving scraper, throughout the full area of such scraper liable to such accumulation, and by the vertical disposition of the fixed scraper, also tends to a gravital discharge of the accumulations removed from the revolving scraper by the fixed scraper.

The scraper arm is adjustable longitudinally in the bearing carried by the colter yoke, so that the revolving scraper, through such adjustment, as well as through its own ball and socket adjustment, may be arranged in any position and at any desired angle with respect to the colter, the simplicity of the scraper arm mounting permitting ready removal of the scrapers when desired.

Having described my invention, what I claim and desire to secure by Letters Patent, is:—

1. A plow colter, a support therefor, an arm carried by the support, a shaft mounted at one end on the arm for universal adjustment, means for locking the shaft against adjustment, and a scraper mounted on the shaft.

2. A plow colter, a support therefor, an arm carried by the support, a scraper supporting member mounted at one end on the arm for universal adjustment, a revolving scraper mounted on said member, and a fixed scraper blade carried by said member for coöperation with the outer face of the revolving scraper.

3. A plow colter, a supporting yoke therefor, a bearing carried by the yoke, an arm adjustably mounted in the bearing, a bracket mounted for vertical adjustment on said arm, a shaft mounted at one end on the bracket for universal adjustment, means for frictionally locking the shaft against adjustment, and a revolving scraper mounted on the shaft for coöperation with the colter.

4. A plow colter, a support therefor, an arm carried by the support, a bracket mounted on the arm having a socket therein, a shaft having a ball terminal seated in said socket, means carried by the bracket for clamping the ball terminal in fixed relation with the bracket, and a revolving scraper mounted on the shaft for coöperation with the colter.

In testimony whereof I affix my signature in presence of two witnesses.

JAMES OLIVER CASADAY.

Witnesses:
AGNES GORDON,
GEORGE J. OLTSCH.

Copies of this patent may be obtained for five cents each, by addressing the "Commissioner of Patents, Washington, D. C."